United States Patent
Wu et al.

(10) Patent No.: US 9,046,707 B2
(45) Date of Patent: Jun. 2, 2015

(54) TOUCH-SENSING LIQUID CRYSTAL PANEL AND FABRICATION METHOD THEREOF

(71) Applicant: HannStar Display Corporation, New Taipei (TW)

(72) Inventors: Hsu-Ho Wu, Tainan (TW); Ping-Yuan Su, Kaohsiung (TW); Yu-Cheng Lin, Pingtung County (TW); Hsing-Ying Lee, Tainan (TW); Kun-Hua Tsai, Tainan (TW)

(73) Assignee: HANNSTAR DISPLAY CORPORATION, New Taipei (TW)

( * ) Notice: Subject to any disclaimer, the term of this patent is extended or adjusted under 35 U.S.C. 154(b) by 33 days.

(21) Appl. No.: 14/155,378

(22) Filed: Jan. 15, 2014

(65) Prior Publication Data

US 2014/0313436 A1  Oct. 23, 2014

(30) Foreign Application Priority Data

Apr. 22, 2013 (CN) .......................... 2013 1 0141463

(51) Int. Cl.
  *G02F 1/1335* (2006.01)
  *G02F 1/1333* (2006.01)
  *G06F 3/041* (2006.01)

(52) U.S. Cl.
  CPC .......... *G02F 1/13338* (2013.01); *G06F 3/0412* (2013.01); *G02F 1/133516* (2013.01); *G06F 3/041* (2013.01)

(58) Field of Classification Search
  CPC ........................... G02F 1/13338; G02F 3/0412
  See application file for complete search history.

(56) References Cited

U.S. PATENT DOCUMENTS 8,217,913 B2 *  7/2012  Hotelling et al. ............. 345/173

* cited by examiner

*Primary Examiner* — Phu Vu
(74) *Attorney, Agent, or Firm* — CKC & Partners Co., Ltd.

(57) ABSTRACT

A touch-sensing liquid crystal panel and a fabrication method thereof are provided. The touch-sensing liquid crystal panel includes a color filter substrate, a transistor substrate, and a sensing matrix. In the fabrication method, at first, a first glass substrate is provided. Then, color filters and a common electrode are disposed on a first surface of the first glass substrate to form a color filter substrate. Thereafter, a transistor substrate is combined with the color filter substrate. Then, the glass substrates of the color filter substrate and the transistor substrate are slimed. Thereafter, a sensing layer is formed on a second surface of the first glass substrate, wherein the second surface is opposite to the first surface. Then, the sensing layer is baked to enable a sheet resistance of the sensing matrix to be equal to or less than 30 ohm/square. Thereafter, the sensing layer is patterned.

6 Claims, 8 Drawing Sheets

TOUCH-SENSING LIQUID CRYSTAL PANEL AND FABRICATION METHOD THEREOF

RELATED APPLICATIONS

This application claims priority to China Application Serial Number 201310141463.5, filed on Apr. 22, 2013, which is herein incorporated by reference.

BACKGROUND

1. Field of Invention

The present invention relates to a touch-sensing liquid crystal panel and a fabrication method thereof. More particularly, the present invention relates to a touch-sensing liquid crystal panel having a touch-sensing matrix using one layer solution (OLS) technology and a fabrication method thereof.

2. Description of Related Art

In recent years, thin and light flat panel displays become the most popular display used in various electronics. In order to enable information products to achieve convenient usage, concise appearance, and having multiple functions, many information products use touch panels as input devices instead of traditional keyboards, mice, etc.

With great development of technology of flat displays and touch panels, in the condition of restricted volume, some electronics combine the touch panel with a display panel to form a touch-sensing display panel, so as to provide a greater viewable screen area and more convenient operation modes to users. Because the touch-sensing display panel has both the display function of the display panel and convenience of input operation of the touch panel, the touch-sensing display panel gradually becomes an important component applied in many electronics such as a handheld PC, a personal digital assistance (PDA), or a smart phone.

In the operation principle of the touch panel, when a conductor object (such as a finger) touches a touch-sensing matrix of the touch panel, electric properties (such as electrical resistance or capacitance) of the touch-sensing matrix are varied accordingly to result in a variance of a bias voltage applied on the touch-sensing matrix. The variance of the electric properties is converted to a control signal outputted to a external control circuit board, and then a processor perform a data calculation process in accordance with control signal to obtain a result. Thereafter, the external control circuit board outputs a display signal to the display panel and present mages to users through the display panel.

In the present various technologies of touch panels, one layer solution (OLS) is the most popular technology, because OLS has advantages of low cost and convenience for assembling. In the OLS technology, a sheet electrical resistance of the touch-sensing matrix affects the performance of touch-sensing operation. For example, if a touch-sensing matrix has a greater sheet resistance, a touch-sensing driver circuit of the touch-sensing matrix needs more power to perform the touch-sensing operation.

Therefore, it is necessary to provide touch-sensing liquid crystal panel and a fabrication method thereof having a sensing matrix with a lower electrical resistance.

SUMMARY

Therefore, an aspect of the present invention provides a touch-sensing liquid crystal panel and a fabrication method thereof. The fabrication method uses low temperature baking technology to form a sensing matrix with lower electrical resistance to provide the touch-sensing liquid crystal panel having better touch-sensing performance.

According to an embodiment of the present invention, the touch-sensing liquid crystal panel includes a color filter substrate, a transistor substrate, a sensing matrix, and a liquid crystal layer. The color filter substrate includes a first glass substrate, a plurality of color filters, and a common electrode layer. The first glass substrate has a first surface and a second surface, wherein the first surface is opposite to the second surface. The color filters are disposed on the first surface of the first glass substrate. The common electrode layer is disposed on the color filter. The sensing matrix is disposed on the second surface of the first glass substrate, wherein material of the sensing matrix is indium tin oxide (ITO), and sheet resistance of the sensing matrix is smaller than or equal to 30 ohm/square, and a thickness of the sensing matrix is in a range from 1000 Angstrom to 1400 Angstrom. The transistor substrate includes a second glass substrate and a plurality of pixel units disposed on the second glass substrate. Each of the pixel units includes a transistor switch and a pixel electrode. The liquid crystal layer is disposed between the color filter substrate and the transistor substrate.

According to another embodiment of the present invention, in the fabrication method of the touch-sensing liquid crystal panel, at first, a step for fabricating a color filter substrate is performed to provide a color filter substrate. In the step for fabricating the color filter substrate, at first, a first glass substrate is provided, wherein the first glass substrate has a first surface and a second surface, and the first surface is opposite to the second surface. Then, a plurality of color filters are disposed on the first surface of the first glass substrate. Thereafter, a common electrode layer is disposed on the color filters to form the color filter substrate. After the step for fabricating the color filter substrate, a step for providing a transistor substrate is performed. The transistor substrate includes a second glass substrate and a plurality of pixel units disposed on the second glass substrate, and each of the pixel units comprises a transistor switch and a pixel electrode. Then, the color filter substrate is combined with the transistor substrate and a liquid crystal layer is disposed between the color filter substrate and the transistor substrate to form a liquid crystal panel. Thereafter, a sensing layer is formed on the second surface of the slimed first glass substrate at a predetermined process temperature, wherein material of the sensing layer is indium tin oxide and a thickness of the sensing layer is in a range from 1000 Angstrom to 1400 Angstrom. Then, the sensing layer is baked at a predetermined baking temperature to enable a sheet resistance of the sensing layer is equal to or smaller than 30 ohm/square. Thereafter, a patterning step is performed to pattern the sensing layer to obtain a sensing matrix.

It can be understood from the above descriptions that the fabrication method of the touch-sensing liquid crystal panel forms a sensing matrix with a sheet resistance equal to or smaller than 30 ohm/square, so as to provide the touch-sensing liquid crystal panel having better performance on touch-sensing. In addition, two sides of the touch-sensing liquid crystal panel are slimed to enable the touch-sensing liquid crystal panel to be thinner and lighter.

BRIEF DESCRIPTION OF THE DRAWINGS

In order to make the foregoing as well as other aspects, features, advantages, and embodiments of the present invention more apparent, the accompanying drawings are described as follows.

DETAILED DESCRIPTION

Figure 1:
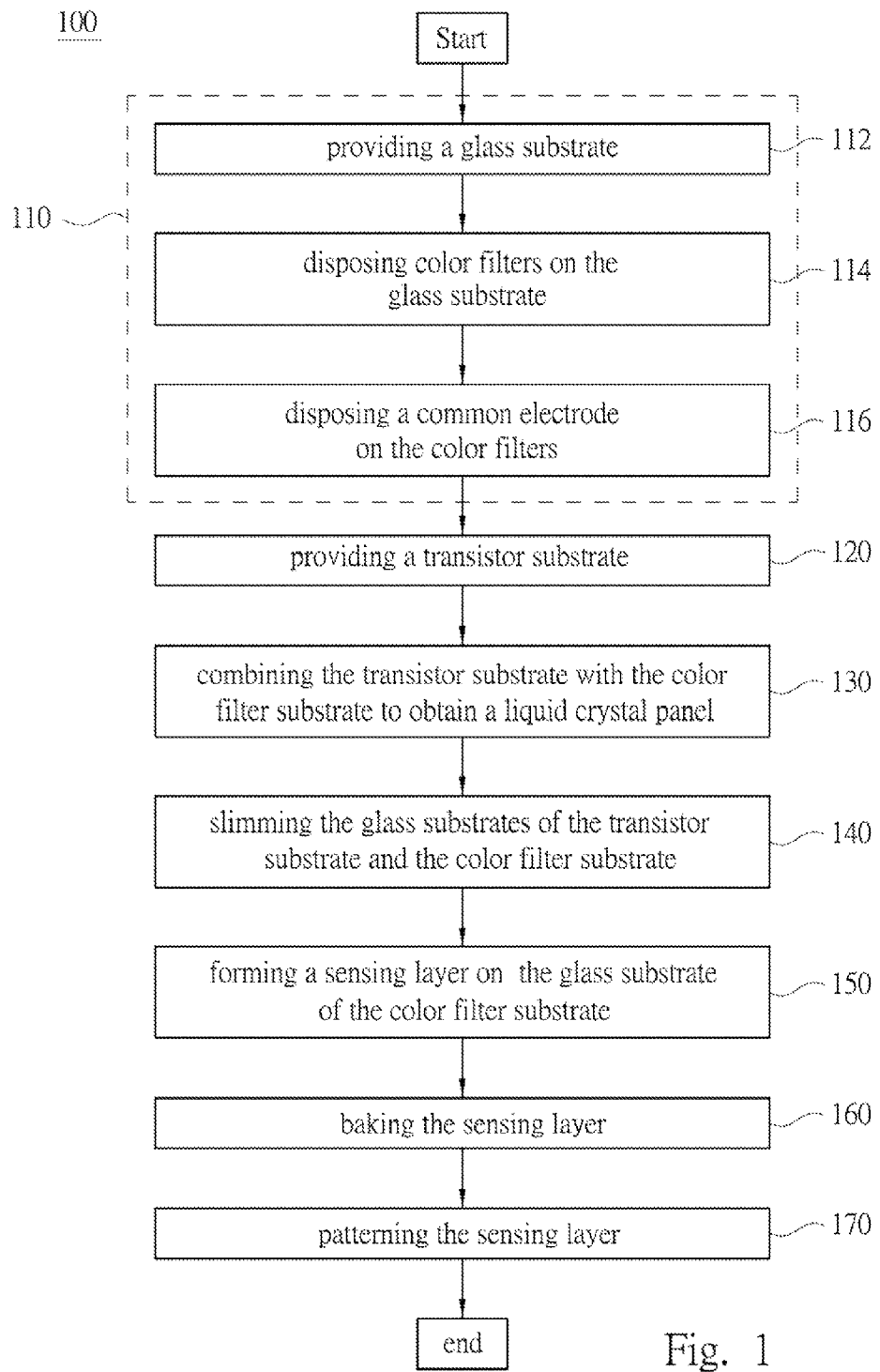
FIG. 1 is a flow chart showing a fabrication method of a touch-sensing liquid crystal panel in accordance with an embodiment of the present invention.

Reference will now be made in detail to the present preferred embodiments of the invention, examples of which are illustrated in the accompanying drawings. Wherever possible, the same reference amounts are used in the drawings and the description to refer to the same or like parts.

Referring to FIG. 1 and FIGS. 2a-2g, FIG. 1 is a flow chart showing a fabrication method 100 of a touch-sensing liquid crystal panel in accordance with an embodiment of the present invention, and FIGS. 2a-2g are cross-sectional views of the touch-sensing liquid crystal panel corresponding to the steps of the fabrication method 100. In the fabrication method 100, at first, a step 110 is performed for providing a color filter substrate. In this embodiment, the step 110 for providing the color filter substrate includes step 112 for providing a substrate, step 114 for disposing color filters and step 116 for disposing a common electrode. In the following descriptions, the step 110 for providing the color filter substrate is described in detail.

Figure 2A:
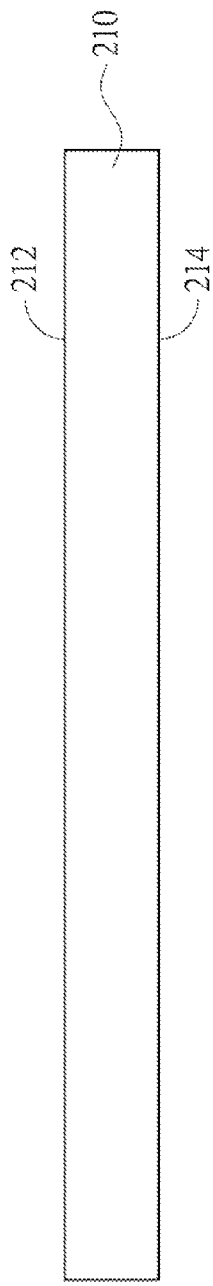
FIGS. 2a-2g are cross-sectional views of the touch-sensing liquid crystal panel corresponding to the steps of the fabrication method in accordance with an embodiment of the present invention.
Figure 2B:
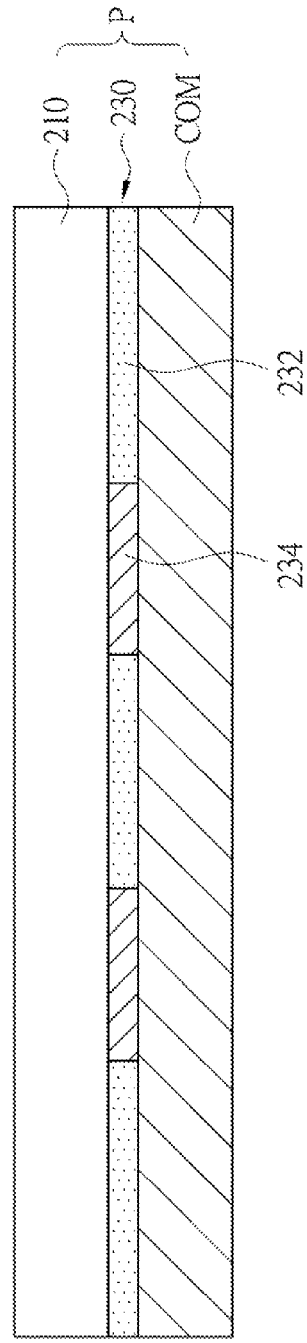

In the step 110 for providing the color filter substrate, at first, the step 112 is performed to provide a glass substrate 210, as shown in FIG. 2a. The glass substrate 210 has surfaces 212 and 214, wherein the surface 212 is opposite to the surface 214. Thereafter, the steps 114 and 116 are sequentially performed to dispose color filters 230 and a common electrode COM on the surface 214 to obtain a color filter substrate P, as shown in FIG. 2b. The color filters 230 include color resistors 232 and black matrixes 234. In this embodiment, the color resistors 232 include red resistors, blue resistors and green resistors, but embodiments of the present invention are not limited thereto. The common electrode COM is disposed on the color filters 230, and thus the color filters 230 are disposed between the glass substrate 210 and the common electrode COM.

Figure 2C:
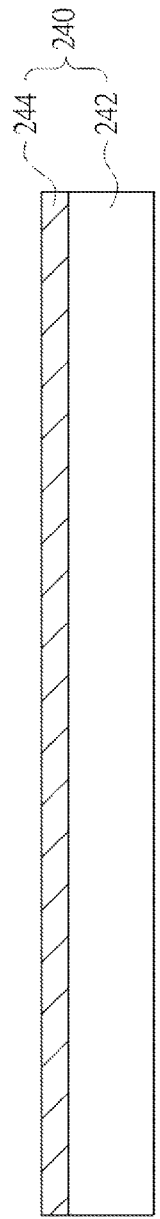

After the step 110 for providing the color filter substrate, a step 120 is performed for providing a transistor substrate 240, as shown in FIG. 2c. The transistor substrate 240 includes a glass substrate 242 and a pixel layer 244. The pixel layer 244 is disposed on the glass substrate 242 and includes a plurality of pixel units (not illustrated). Each of the pixel units includes transistor switches and a pixel electrode to sequentially receive image data signals to control alignment of liquid crystal molecules in a liquid crystal layer to LC.

Figure 2D:
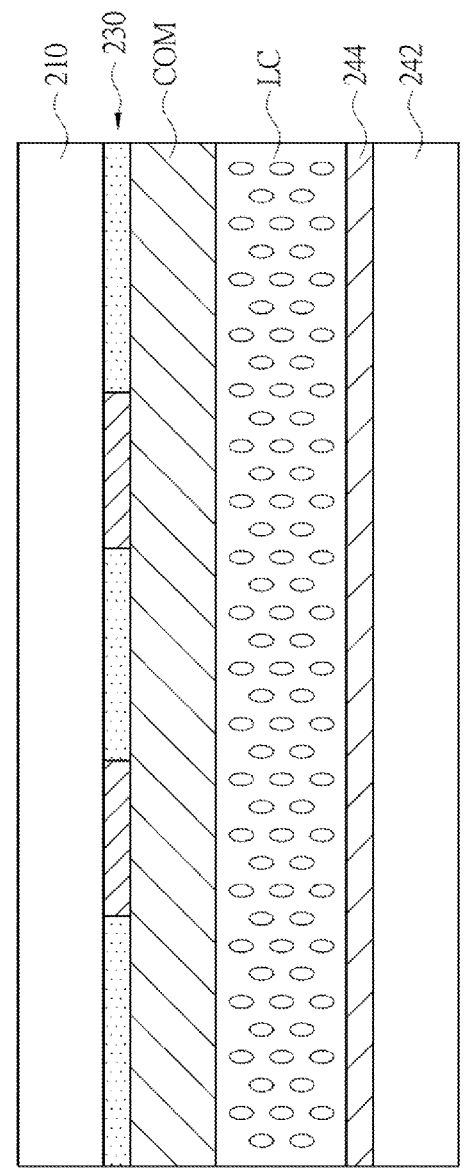

After the step 120 for providing the transistor substrate 240, a step 130 is performed to combine the transistor substrate 240 with the color filter substrate P and to dispose the liquid crystal layer LC between the transistor substrate 240 and the color filter substrate P to obtain a touch-sensing liquid crystal panel 200, as shown in FIG. 2d, wherein the common electrode COM of the touch-sensing liquid crystal panel 200 is located between the liquid crystal layer LC and the color filters 230. In this embodiment, the combination of the transistor substrate 240 and the color filter substrate P are performed by using a sealant, but embodiments of the present invention are not limited thereto.

Figure 2E:
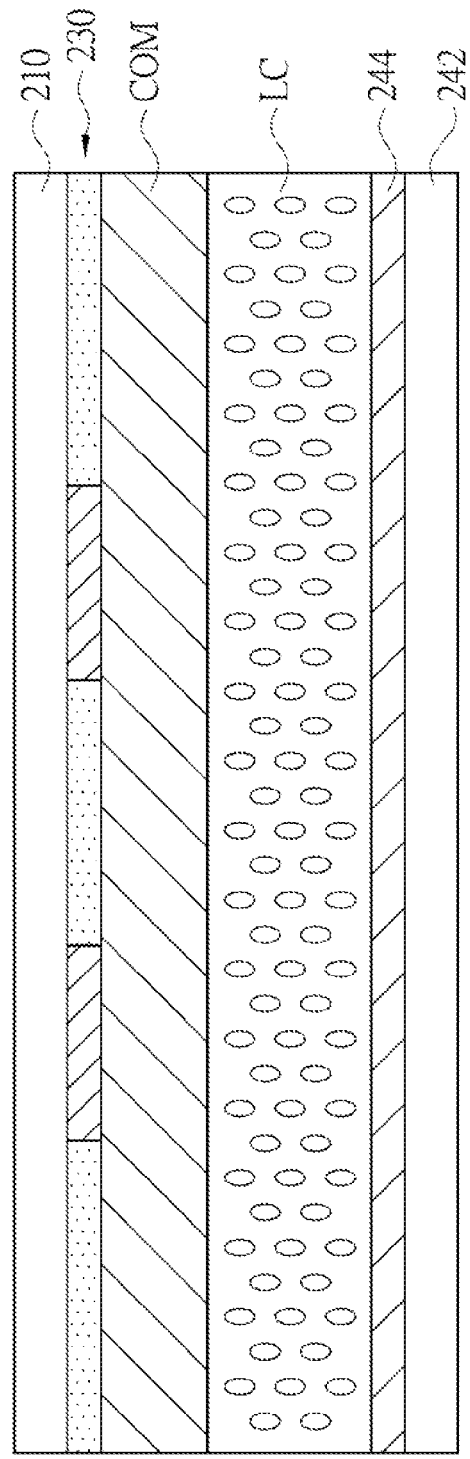

After the step 130 for combining the transistor substrate 240 with the color filter substrate P, a slimming step 140 is performed to slim the touch-sensing liquid crystal panel 200, as shown in FIG. 2e. In this embodiment, the slimming step 140 is performed on the glass substrate 242 of the transistor substrate 240 and the glass substrate 210 of the color filter substrate P to respectively reduce the thickness of the glass substrates 210 and 240 from 0.4 mm to 0.2 mm. In other words, the thickness of the glass substrates 210 and 242 is reduced 50%.

Figure 2F:
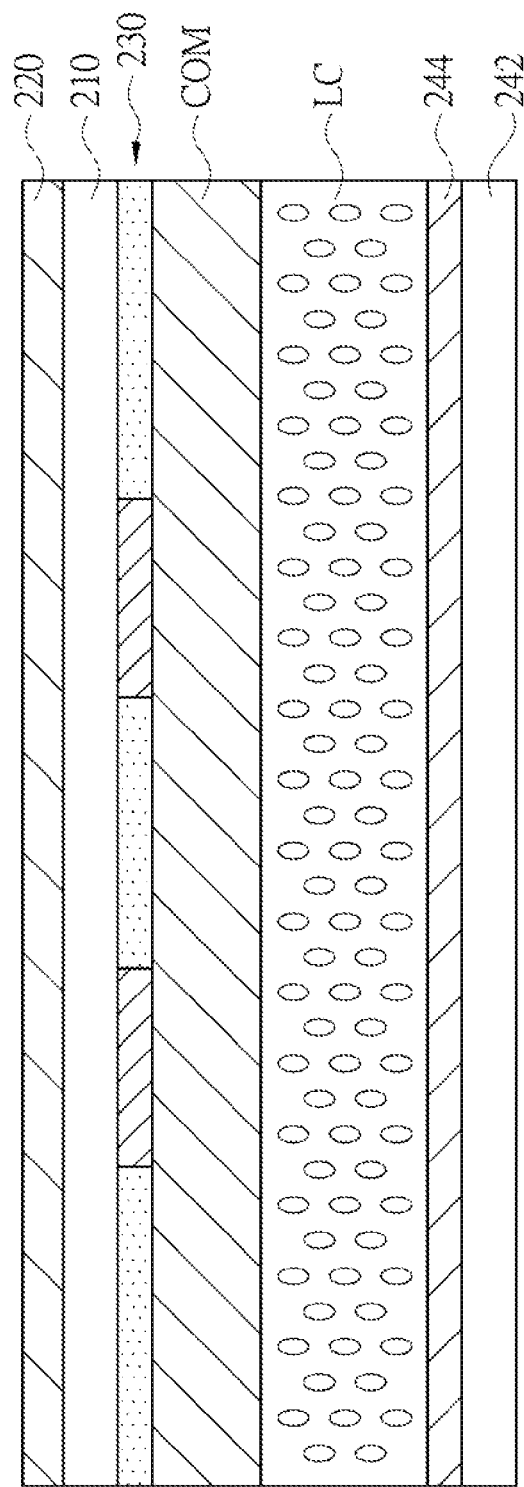

After the step 140 for slimming the touch-sensing liquid crystal panel 200, a step 150 is performed to form a sensing layer 220 on the surface 212 of the glass substrate 210 at a predetermined process temperature, as shown in FIG. 2f. In this embodiment, the predetermined process temperature is in a range from 25° C. to 150° C., and a sputter technology is used to form the sensing layer 220 on the glass substrate 210. However, embodiments of the present invention are not limited thereto. In addition, a material of the sensing layer 220 is indium tin oxide (ITO) and the sensing layer 220 has a thickness in a range from 1000 Angstrom to 1400 Angstrom.

After the step 150 for forming the sensing layer 220, a baking step 160 is performed to enable the sensing layer to have a sheet resistance smaller than or equal to 30 ohm/square. In this embodiment, a predetermined baking temperature is in a range from 110° C. to 150° C., thereby reducing the sheet resistance of the sensing layer 220 to 30 ohm/square or less.

Figure 2G:
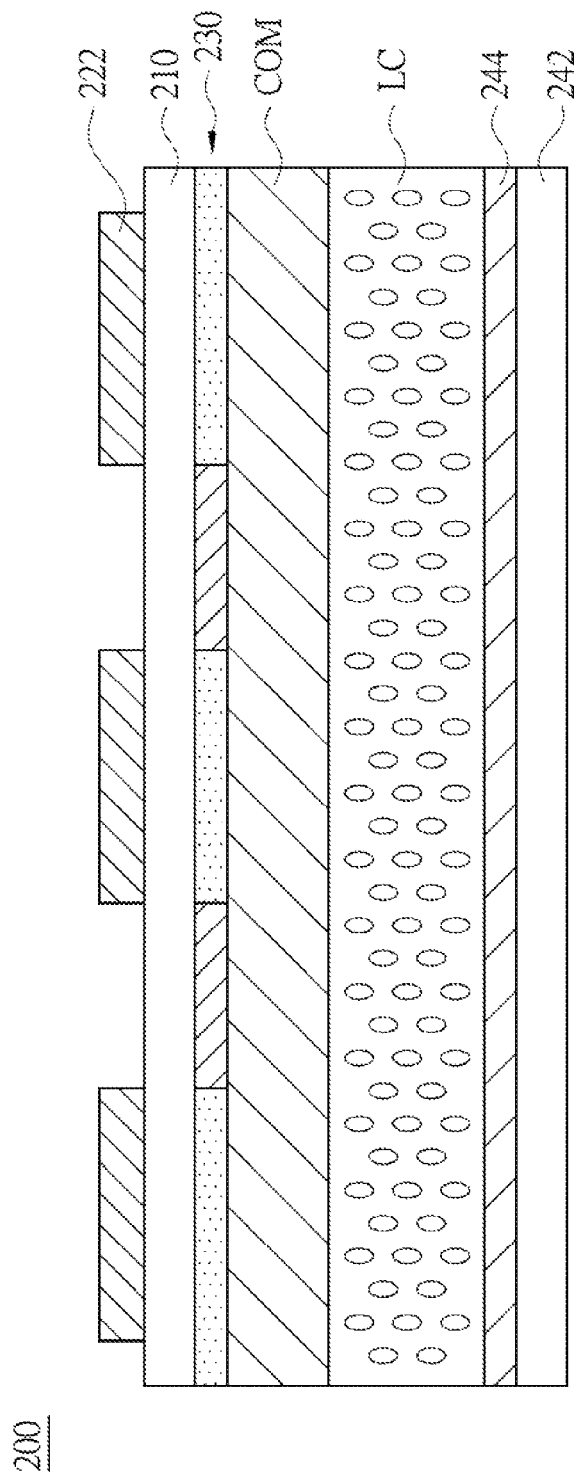

After the baking step 160, a patterning step 170 is performed to pattern the sensing layer 220 to obtain a sensing matrix 222 as shown in FIG. 2g. In this embodiment, the sensing matrix 222 includes ITO lines L coupled to each other, as shown in FIG. 5. However, patterns of the sensing matrixes 222 of embodiments of the present invention are not limited thereto.

The patterning step 170 can be implemented by using a photolithography process. It is noted that the photolithography process forms the pattern of the sensing matrix 222 by using only one mask. In addition, the patterning step 170 of this embodiment is not limited to be performed after the baking step 160. In other embodiments of the present invention, the patterning step 170 can be performed before the baking step 160. It can be understood from the above descriptions that the fabrication method 100 of the touch-sensing liquid crystal panel uses the baking step 160 to provide the sensing matrix 222 having a sheet resistance smaller than or equal to 30 ohm/square to decrease the power used to perform the touch-sensing operation. In addition, the fabrication method 100 of the touch-sensing liquid crystal panel includes a slimming process to provide the thin and light touch-sensing liquid crystal panel 200.

Figure 3:
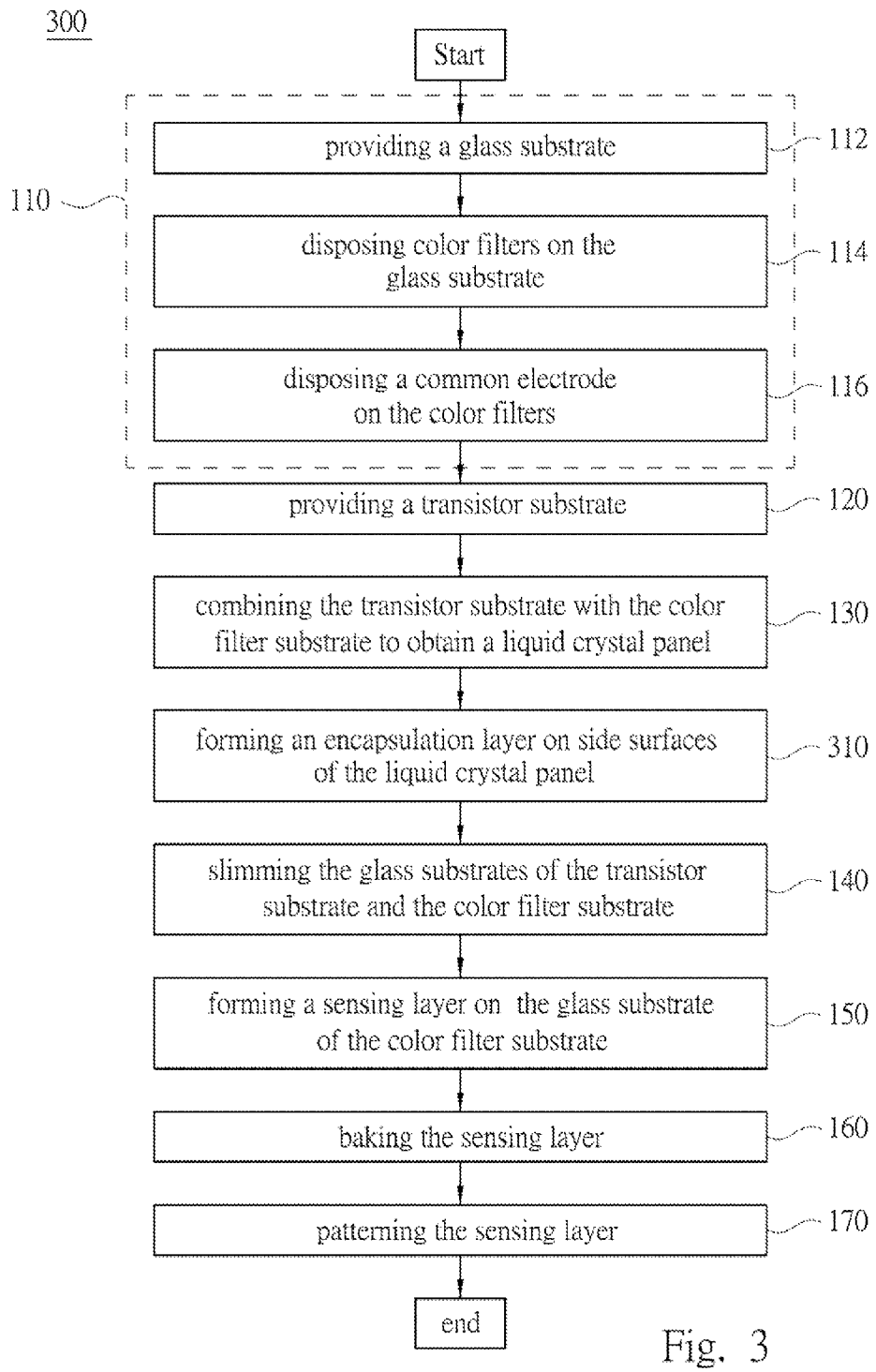
FIG. 3 is a flow chart showing a fabrication method of a touch-sensing liquid crystal panel in accordance with another embodiment of the present invention.

Referring to FIG. 3, FIG. 3 is a flow chart showing a fabrication method 300 of a touch-sensing liquid crystal panel in accordance with another embodiment of the present invention. The fabrication method 300 is similar to the fabrication method 100, but the difference is in that the fabrication method 300 further includes an encapsulating step 310.

Figure 4:
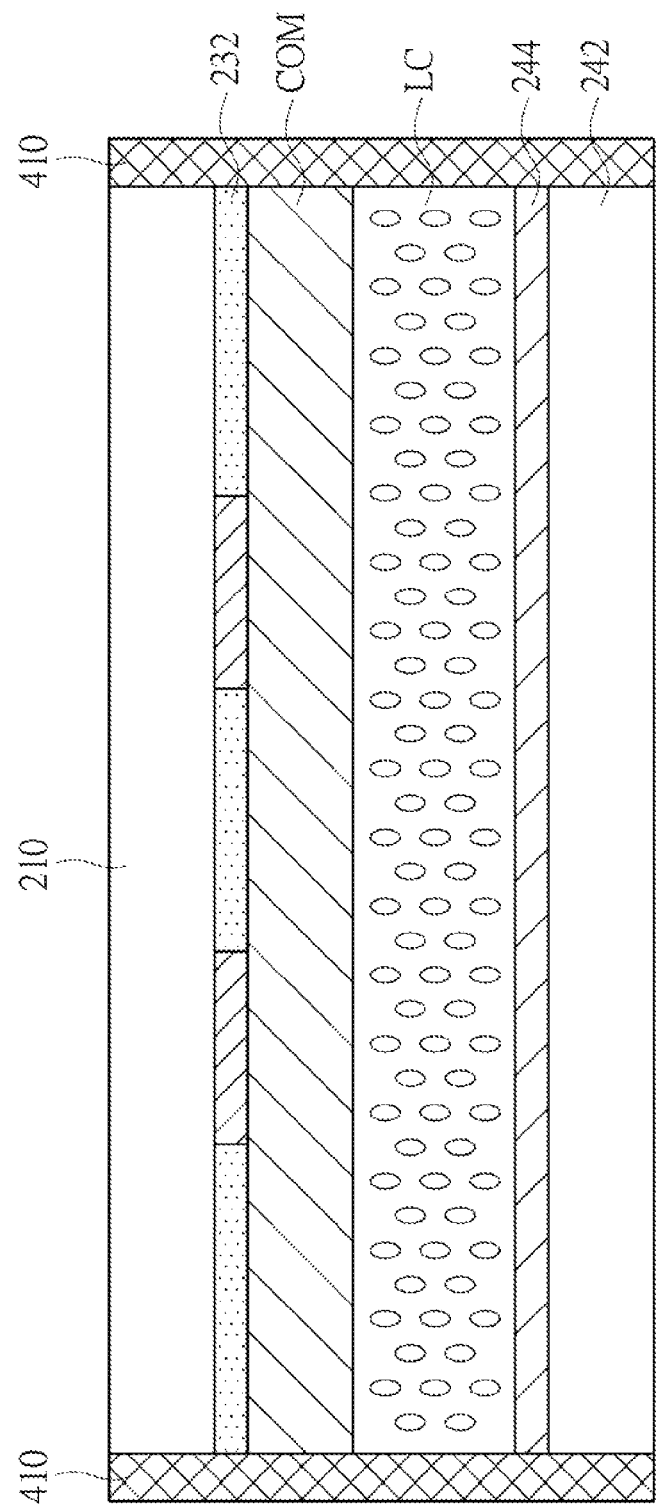
FIG. 4 is a cross-sectional view of the touch-sensing liquid crystal panel corresponding to the encapsulating step of the fabrication method in accordance with an embodiment of the present invention.

The encapsulating step 310 is performed between the combination step 130 and the slimming step 140. The encapsulating step 310 is performed before the slimming step 140 to form an encapsulation layer 410 on side surfaces of the touch-sensing liquid crystal panel to protect the side surfaces of the touch-sensing liquid crystal panel, as shown in FIG. 4. The encapsulation layer 410 is used to protect the side surfaces of the touch-sensing liquid crystal panel to prevent the side surfaces of the touch-sensing liquid crystal panel from being damaged during following processes. The encapsulation layer 410 is formed by using a peelable sealant, but embodiments of the present invention are not limited thereto.

It can be understood from the above descriptions that the fabrication method 300 of the touch-sensing liquid crystal panel uses the encapsulating step 310 to form the encapsulation layer 410 to prevent the side surfaces of the touch-sensing liquid crystal panel from being damaged by the slimming step 140. The fabrication method 300 of the touch-sensing liquid crystal panel not only simplifies the production process of the touch-sensing liquid crystal panel but also follows design standards of thin-film transistors, so as to provide a more reliable touch-sensing liquid crystal panel.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch-sensing liquid crystal panel, comprising:
    a color filter substrate including:
        a first glass substrate having a first surface and a second surface, wherein the first surface is opposite to the second surface;
        a plurality of color filters disposed on the first surface of the first glass substrate; and
        a common electrode layer disposed on the color filters;
    a sensing matrix disposed on the second surface of the first glass substrate, wherein the sensing matrix is formed from indium tin oxide (ITO), and the sensing matrix has sheet resistance smaller than or equal to 30 ohm/square, and the sensing matrix has a thickness ranging from 1000 Angstroms to 1400 Angstroms; and
    a transistor substrate comprising:
        a second glass substrate; and
        a plurality of pixel units disposed on the second glass substrate, and each of the pixel units comprises a transistor switch and a pixel electrode; and
    a liquid crystal layer disposed between the color filter substrate and the transistor substrate.

2. The touch-sensing liquid crystal panel of claim 1, wherein each of the first glass substrate and the second glass substrate is treated by a slimming process, and has a thickness smaller than 0.2 mm.

3. A fabrication method of a touch-sensing liquid crystal panel, comprising:
    performing a step for fabricating a color filter substrate, comprising:
        providing a first glass substrate having a first surface and a second surface opposite to the first surface;
        disposing a plurality of color filters on the first surface of the first glass substrate; and
        disposing a common electrode layer on the color filters to form the color filter substrate;
    providing a transistor substrate, wherein the transistor substrate comprises:
        a second glass substrate; and
        a plurality of pixel units formed on the second glass substrate, and each of the pixel units comprises a transistor switch and a pixel electrode;
    combining the color filter substrate with the transistor substrate and disposing a liquid crystal layer between the color filter substrate and the transistor substrate to form a liquid crystal panel;
    performing a slimming process on the liquid crystal panel to slim the first glass substrate and the second glass substrate of the liquid crystal panel;
    forming a sensing layer on the second surface of the slimed first glass substrate at a predetermined process temperature, wherein material of the sensing layer is indium tin oxide and a thickness of the sensing layer is in a range from 1000 Angstroms to 1400 Angstroms;
    baking the sensing layer at a predetermined baking temperature to enable a sheet resistance of the sensing layer is equal to or smaller than 30 ohm/square; and
    performing a patterning step to pattern the sensing layer to obtain a sensing matrix.

4. The fabrication method of claim 3, wherein each of the first glass substrate and the second glass substrate has a thickness smaller than 0.2 mm after the slimming process.

5. The fabrication method of claim 3, wherein the step for combining the color filter substrate with the transistor substrate comprises an encapsulating step, and the encapsulating step forms an encapsulation layer on a plurality of side surfaces of the liquid crystal panel to protect the side surfaces of the liquid crystal panel.

6. The fabrication method of claim 3, wherein the patterning step comprises a photo-lithography process to form a predetermined pattern on the sensing layer.

* * * * *